(12) United States Patent
Kurokawa

(10) Patent No.: US 7,717,487 B2
(45) Date of Patent: May 18, 2010

(54) SEAT HOLDING PORTION STRUCTURE

(75) Inventor: Hiroyuki Kurokawa, Nissin (JP)

(73) Assignee: Toyota Jidosha Kabushiki Kaisha, Toyota-shi, Aiki-ken (JP)

( * ) Notice: Subject to any disclaimer, the term of this patent is extended or adjusted under 35 U.S.C. 154(b) by 0 days.

(21) Appl. No.: 12/323,898

(22) Filed: Nov. 26, 2008

(65) Prior Publication Data

US 2009/0134687 A1    May 28, 2009

(30) Foreign Application Priority Data

Nov. 28, 2007    (JP)    ............................. 2007-306930

(51) Int. Cl.
*B60N 2/015* (2006.01)

(52) U.S. Cl. .................. 296/63; 296/30; 296/65.13

(58) Field of Classification Search .................. 296/29, 296/30, 63, 65.13, 65.14, 65.15, 187.08, 296/193.07, 204
See application file for complete search history.

(56) References Cited

U.S. PATENT DOCUMENTS

| | | | | |
|---|---|---|---|---|
| 4,557,519 | A * | 12/1985 | Matsuura | 296/204 |
| 5,102,187 | A * | 4/1992 | Harasaki | 296/204 |
| 5,195,780 | A * | 3/1993 | Inoue et al. | 280/834 |
| 5,381,871 | A * | 1/1995 | Ohta | 180/296 |
| 5,558,369 | A * | 9/1996 | Cornea et al. | 280/800 |
| 5,609,386 | A * | 3/1997 | Takahashi et al. | 296/204 |
| 5,788,322 | A * | 8/1998 | Wolf et al. | 296/181.4 |
| 6,361,102 | B1 * | 3/2002 | Han | 296/203.02 |
| 6,629,721 | B1 * | 10/2003 | Macey | 297/15 |
| 6,793,276 | B2 * | 9/2004 | Sugihara et al. | 296/204 |
| 6,857,691 | B2 * | 2/2005 | Kuroda et al. | 296/203.02 |
| 6,932,407 | B2 * | 8/2005 | Cuerrier et al. | 296/63 |
| 7,237,833 | B1 * | 7/2007 | Moll | 296/204 |
| 7,270,365 | B2 * | 9/2007 | Suzuki et al. | 296/187.08 |
| 7,407,223 | B2 * | 8/2008 | Ito et al. | 296/193.07 |
| 7,631,918 | B2 * | 12/2009 | Yasukouchi et al. | 296/30 |
| 2005/0082878 | A1 * | 4/2005 | Yamada et al. | 296/204 |

FOREIGN PATENT DOCUMENTS

| | | | | |
|---|---|---|---|---|
| JP | 62128886 | A | * | 6/1987 |
| JP | 02034442 | A | * | 2/1990 |
| JP | 04071967 | A | * | 3/1992 |
| JP | 05085423 | A | * | 4/1993 |
| JP | 7-15483 | | | 3/1995 |
| JP | 10059027 | A | * | 3/1998 |
| JP | 2004-262365 | | | 9/2004 |
| JP | 2006168556 | A | * | 6/2006 |

* cited by examiner

*Primary Examiner*—Glenn Dayoan
*Assistant Examiner*—Paul A Chenevert
(74) *Attorney, Agent, or Firm*—Finnegan, Henderson, Farabow, Garrett & Dunner, LLP

(57) ABSTRACT

A seat holding portion structure has a side member that extends substantially in a vehicle longitudinal direction. The side member has a kick portion whose front and rear end sides are bent and that joins a front portion and a rear portion of the side member that are offset in a vehicle vertical direction. A floor reinforcement is installed within the side member from an opening portion of a vehicle body floor. A rear end portion of an elongated seat holding member is inserted in the floor reinforcement. A connecting body having a closed cross-sectional structure is fixed to a rear end portion of the seat holding member and is disposed at a rear end side bent portion of the kick portion, and, together with the floor reinforcement, is mounted to the side member.

3 Claims, 8 Drawing Sheets

SEAT HOLDING PORTION STRUCTURE

CROSS-REFERENCE TO RELATED APPLICATION

This application claims priority under 35 USC 119 from Japanese Patent Application No. 2007-306930, the disclosure of which is incorporated by reference herein.

BACKGROUND OF THE INVENTION

1. Field of the Invention

The present invention relates to a seat holding portion structure that mounts a seat holding member to a side member.

2. Description of the Related Art

In underbody structures of vehicles, there are cases in which lower seat rails (seat holding members) are set within reinforcements (side members) that extend in the vehicle longitudinal direction (see, for example, Japanese Utility Model Application Laid-Open (JP-U) No. 7-15483). In such an embedded structure, when load at the time of a collision is transmitted to the mounting portion of the lower seat rail via the seat and cross-sectional collapsing arises at the reinforcement (side member), there are cases in which the reinforcement (side member) buckles.

SUMMARY OF THE INVENTION

In view of the above, an object of the present invention is to provide a seat holding portion structure that can prevent or suppress buckling of a side member that is caused by input of load from a seat side at the time of a collision.

A seat holding portion structure of a first aspect of the present invention has: a side member joined to a bottom surface side of a vehicle body floor and extending substantially in a vehicle longitudinal direction and, together with the vehicle body floor, forming a closed cross-sectional portion that extends substantially in the vehicle longitudinal direction, the side member having a kick portion that joins a front portion and a rear portion of the side member that are offset in a vehicle vertical direction, and front and rear end sides of the kick portion are bent; a floor reinforcement formed in a shape of a box whose vehicle upper side is open, the floor reinforcement being installed within the side member from an opening portion of the vehicle body floor that is formed in a vicinity of the kick portion; a seat holding member that is elongated and extends in the vehicle longitudinal direction at a vehicle upper side of the vehicle body floor, and supports a vehicle seat, a rear end portion of the seat holding member being inserted in the floor reinforcement; and a connecting body fixed to a rear end portion of the seat holding member and disposed within the floor reinforcement, and disposed in a range that extends over a front and rear of at least one of a front end side bent portion and a rear end side bent portion of the kick portion, and, together with the floor reinforcement, mounted to a bottom portion and an upper end portion of the side member, and formed as a closed cross-sectional structure as seen in a vehicle front view.

In accordance with the seat holding portion structure of the above-described aspect of the present invention, the connecting body, that is fixed to the rear end portion of the seat holding member, is disposed within the floor reinforcement and is mounted to the bottom portion and the top end portion of the side member. Therefore, for example, at the time of a collision, the load that is applied from a vehicle occupant to a seat belt device is transmitted to the side member via the seat, the seat holding member, the connecting body and the floor reinforcement. The side member thereby receives load that is obliquely upward toward the front of the vehicle.

Here, the connecting body is disposed in a range that extends over the front and rear of at least one of the front end side bent portion and the rear end side bent portion of the kick portion of the side member, and, together with the floor reinforcement, is mounted to the bottom portion and the top end portion of the side member. Therefore, the connecting body, together with the side member and the floor reinforcement, resists the load in the range that extends over the front and rear of that bent portion. Thus, deformation of the side member in this range is suppressed. Further, the connecting body is made to be a closed cross-sectional structure in a vehicle front view. Therefore, the occurrence of cross-sectional collapsing (cross-sectional deformation) of the connecting body, and accordingly, the occurrence of cross-sectional collapsing of the side member, is effectively suppressed. For these reasons, the occurrence of buckling, whose origin is that bent portion of the side member, is prevented or suppressed.

In the seat holding portion structure of the above-described aspect of the present invention, a closed cross-sectional portion of the connecting body may be structured to extend substantially in the vehicle longitudinal direction so as to include a position covering the rear end portion of the seat holding member.

In accordance with the seat holding portion structure of the above-described structure, the closed cross-sectional portion of the connecting body extends substantially in the vehicle longitudinal direction so as to include a position covering the rear end portion of the seat holding member. Therefore, even if load that is obliquely upward toward the vehicle front side is applied from the seat side to the seat holding member, the connecting body and the side member at the time of a collision, that load is supported stably. Further, even if the rear end portion of the seat holding member is not covered by a separate cover, entry of foreign matter in between the connecting body and the seat holding member is obstructed.

In the seat holding portion structure of the above-described aspect of the present invention, the connecting body may be structured to include a bracket that has a flange at an upper end and is formed in an open cross-sectional shape whose vehicle upper side is open as seen in a vehicle front view, and a lid that is joined to a flange top surface of the bracket, and, together with the bracket, forms a closed cross-sectional structure, and, together with the bracket and the floor reinforcement, is mounted to the upper end portion of the side member.

In accordance with the seat holding portion structure of the above-described structure, the lid of the connecting body is joined to the flange top surface of the bracket and, together with the bracket, forms a closed cross-sectional structure. The lid is, together with the bracket and the floor reinforcement, mounted to the upper end portion of the side member. Thus, although the structure is simple, the rigidity and strength in a vicinity of the portion of the connecting body that is mounted to the upper end portion of the side member are effectively increased. Even if load obliquely upward toward the front of the vehicle is applied to the connecting body from the seat side via the seat holding member at the time of a collision, the occurrence of cross-sectional collapsing of the connecting body and the side member is effectively suppressed.

As described above, in accordance with the seat holding portion structure that relates to the above-described aspect of the present invention, there is the excellent effect that buckling of the side member, that is caused by input of load from the seat side at the time of a collision, can be prevented or suppressed.

Further, by structuring the closed cross-sectional portion of the connecting body to extend substantially in the vehicle longitudinal direction so as to include a position covering the rear end portion of the seat holding member, the seat holding portion structure of the above-described aspect has the excellent effects that the load applied from the seat side at the time of a collision can be stably supported, and there is no need to cover the rear end portion of the seat holding member with a separate cover.

Moreover, by structuring the connecting body to include a bracket that has a flange at an upper end and is formed in an open cross-sectional shape whose vehicle upper side is open as seen in a vehicle front view, and a lid that is joined to a flange top surface of the bracket, and, together with the bracket, forms a closed cross-sectional structure, and, together with the bracket and the floor reinforcement, is mounted to the upper end portion of the side member, the seat holding portion structure, although a simple structure, has the excellent effect that the occurrence of cross-sectional collapsing (cross-sectional deformation) of the connecting body and the side member can be effectively suppressed even if load is inputted from the seat side at the time of a collision.

BRIEF DESCRIPTION OF THE DRAWINGS

FIG. 8A shows a state before folding of an extended portion, and FIG. 8B shows a state in which the extended portion is folded (a portion of the final configuration is shown by the two-dot chain line).

DETAILED DESCRIPTION OF THE INVENTION

First Exemplary Embodiment

A seat holding portion structure relating to a first exemplary embodiment of the present invention will be described by using FIG. 1 through FIG. 5. Note that, of the arrows that are written appropriately in the respective drawings, arrow FR indicates the frontward side of the vehicle, arrow UP indicates the upward side of the vehicle, and arrow IN indicates the inner side in the vehicle transverse direction.

Figure 1:
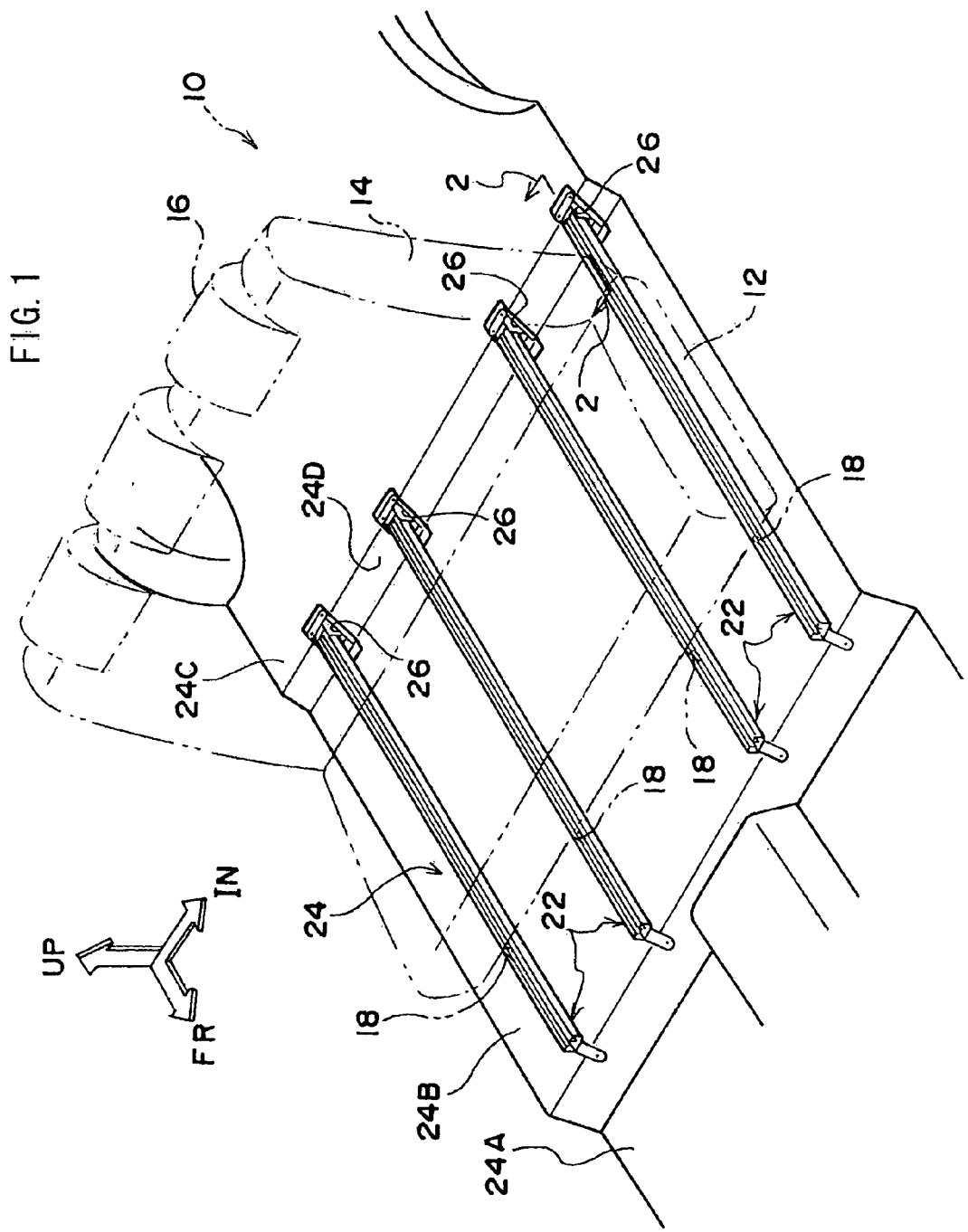
FIG. 1 is a perspective view showing a body structure in a vicinity of a vehicle body floor to which a seat holding portion structure relating to a first exemplary embodiment is applied.

As shown in FIG. 1, a rear seat 10 (two or three seats constituting the rear seat) serving as a vehicle seat is disposed within the vehicle cabin. The rear seat 10 is structured to include a seat cushion 12 upon which a vehicle occupant sits, a seat back 14 disposed in an upright state at the rear end portion of the seat cushion 12, and a headrest 16 disposed at the top end portion of the seat back 14 and supporting the head portion of the vehicle occupant.

Plural (a total of four in the present exemplary embodiment) seat legs 18, whose longitudinal directions are parallel to the vehicle longitudinal direction, are disposed at the bottom surface side of the seat cushion 12 at the rear seat 10. The bottom end portions of the seat legs 18 are seat rail inners 20 (see FIG. 3). The seat rail inners 20 (see FIG. 3) are slidably inserted and fit in elongated seat slide rails 22 that are formed in the shapes of channels and serve as seat holding members. As shown in FIG. 1, the seat slide rails 22 extend along the vehicle longitudinal direction at the vehicle upper side of a vehicle body floor 24, and support the rear seat 10.

Figure 2:
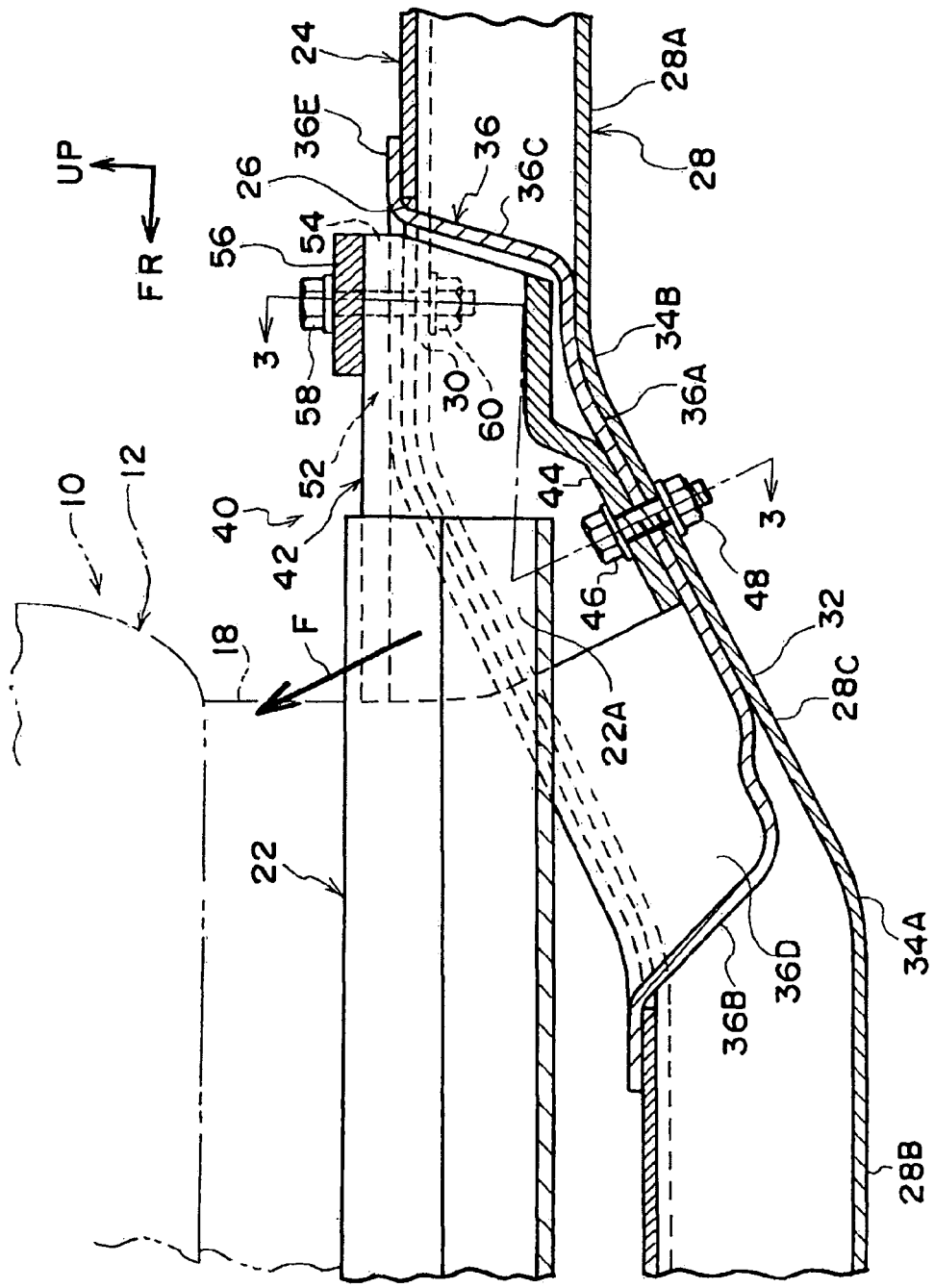
FIG. 2 is a longitudinal sectional view (an enlarged sectional view along line 2-2 of FIG. 1) showing a state in which the body structure shown in FIG. 1 is cut along a rear floor side member, and this is viewed from a side of the vehicle.
Figure 3:
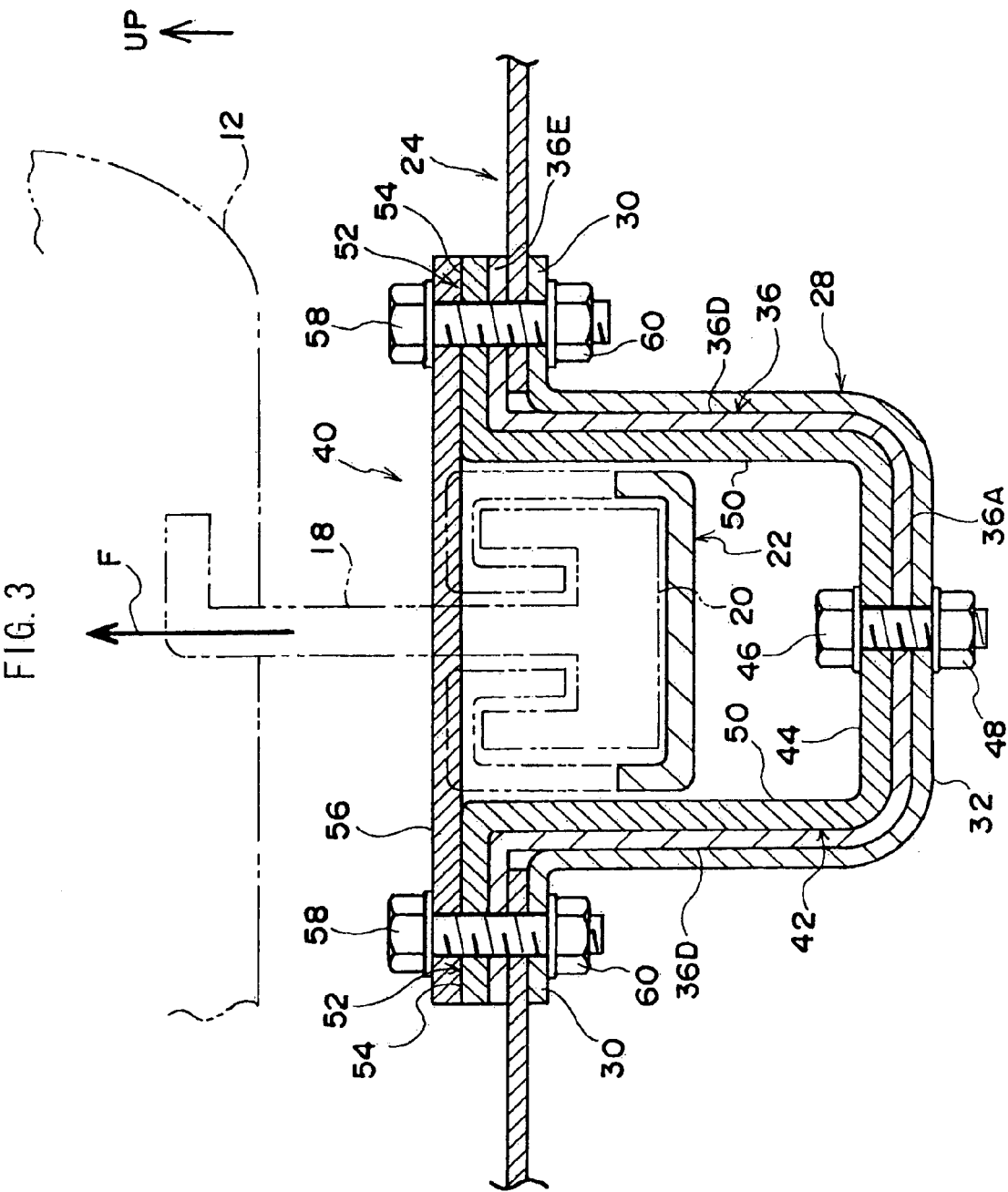
FIG. 3 is an enlarged sectional view along line 3-3 of FIG. 2.

As shown in FIG. 2 that is an enlarged sectional view along line 2-2 of FIG. 1, rear floor side members 28 extend such that the longitudinal directions thereof are substantially parallel to the vehicle longitudinal direction, at the bottom surface sides of both sides of the vehicle body floor 24. As shown in FIG. 3, the rear floor side member 28 is formed such that the cross-sectional configuration thereof in the direction orthogonal to the longitudinal direction is shaped as a hat whose vehicle body upper side is open. Namely, the rear floor side member 28 is a member that projects convexly toward the vehicle lower side with respect to the vehicle body floor 24. As shown in FIG. 2, upper end flange portions 30 of the rear floor side member 28 are joined to the bottom surface side of the vehicle body floor 24 by spot welding or the like. The rear floor side member 28 and the vehicle body floor 24 thereby structure a closed cross-sectional portion that extends substantially in the vehicle longitudinal direction.

As shown in FIG. 1, the vehicle body floor 24 has a center floor portion 24B on which the rear seat 10 is disposed, and, further toward the vehicle front side than the center floor portion 24B, has a front floor portion 24A, and, further toward the vehicle rear side than the center floor portion 24B, has a rear floor portion 24C. Here, the rear floor portion 24C is formed in the shape of a step that is one step higher than the center floor portion 24B, in relation to the placement of a rear differential gear unit (not shown), a rear suspension (not shown), and the like. Namely, the vehicle body floor 24 in the present exemplary embodiment is a structure in which the rear floor portion 24C is offset further toward the vehicle upper side than the center floor portion 24B. The rear floor portion 24C and the center floor portion 24B are connected by an inclined portion 24D that is inclined toward the vehicle upper side along the direction toward the vehicle body rear side.

As shown in FIG. 2, the rear floor side member 28 also is a shape in which, as seen in side view, a member rear portion 28A is offset by a predetermined distance toward the vehicle upper side with respect to a member front portion 28B. Moreover, the member front portion 28B and the member rear portion 28A are connected (joined) together via a kick portion 28C that is inclined toward the vehicle upper side along the direction toward the vehicle body rear side, as seen in side view. The front and rear end sides of the kick portion 28C are bent (the front end side bent portion is denoted by reference numeral 34A, and the rear end side bent portion is denoted by reference numeral 34B).

An opening 26 is formed in the vehicle body floor 24 in a vicinity of the kick portion 28C (a range that includes the region opposing the kick portion 28C and the region in a vicinity thereof). A floor reinforcement 36 is inserted into the opening 26 toward the interior of the cross-section of the kick portion 28C. The floor reinforcement 36 is installed within the rear floor side member 28 from the opening 26.

The floor reinforcement 36 is formed in the shape of a box whose vehicle upper side is open. A bottom wall portion 36A of the floor reinforcement 36 is disposed in a state of abutting a range over the front and rear (in the vehicle longitudinal direction) of the bottom surface of the rear end side bent portion 34B (the rear end of the kick portion 28C of the rear floor side member 28 and a region in a vicinity of the vehicle rear side of the kick portion 28C). Further, the floor reinforcement 36 has a front wall portion 36B that is bent substantially toward the vehicle upper side from the front end portion of the bottom wall portion 36A, a rear wall portion 36C that is bent substantially toward the vehicle upper side from the rear end portion of the bottom wall portion 36A, and a pair of left and right side wall portions 36D (see FIG. 3). The floor reinforcement 36 also has a mounting flange portion 36E that is frame-shaped and formed by folding at the peripheral edge portion of the opening thereof. The mounting flange portion 36E is fixed by spot welding or the like to the top surface of the vehicle body floor 24.

A rear end portion 22A of the seat slide rail 22 is inserted in the floor reinforcement 36 from the opening 26 of the vehicle body floor 24. The opening 26 is formed in the vehicle body floor 24 and the rear end portion 22A of the seat slide rail 22 is inserted into the floor reinforcement 36 in order to suppress the amount of projection of the seat slide rail 22 toward the vehicle upper side with respect to the vehicle body floor 24. Note that, by suppressing the amount of projection of the seat slide rail 22, the heightwise position of the flat floor carpet surface (not shown) can be contained.

The top end of the front portion of a seat rail bracket 42, that structures a portion of a connecting body 40, is fixed by welding to the rear end portion 22A of the seat slide rail 22. The seat rail bracket 42 is disposed within the floor reinforcement 36, and is disposed in a range over the front and rear (in the vehicle longitudinal direction) of the rear end side bent portion 34B of the kick portion 28C (in other words, in a range from the rear portion of the kick portion 28C to a position past the rear end side bent portion 34B (the point of bending at the rear end side)) (i.e., so as to cover the point of bending at the rear end side).

Figure 5:
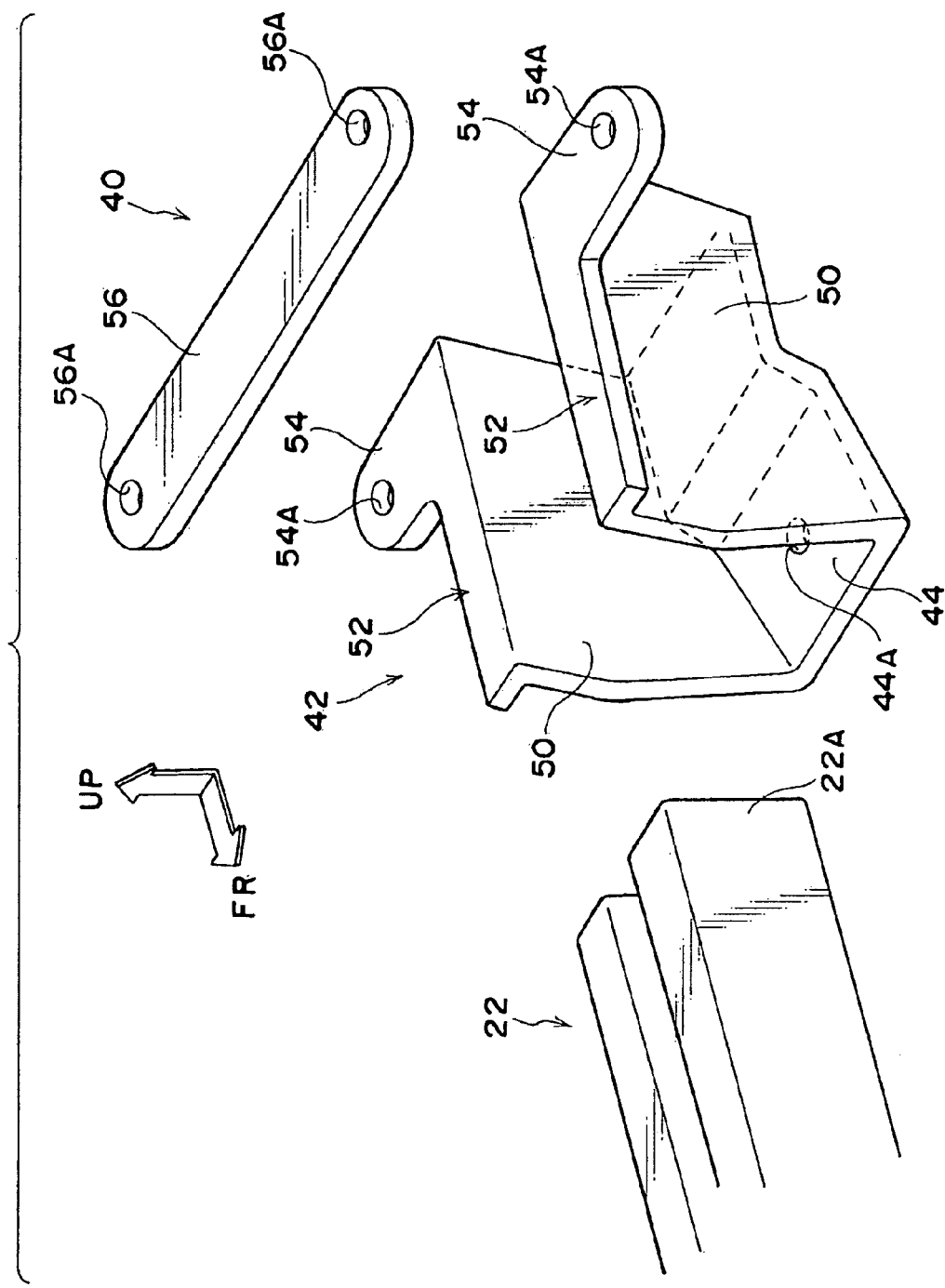
FIG. 5 is an exploded perspective view showing the rear end portion of the seat slide rail and the connecting body of the seat holding portion structure relating to the first exemplary embodiment.

The seat rail bracket 42 is a firm member and almost a rigid body that is formed by a high tensile steel sheet. As shown in FIG. 3, as seen in a vehicle front view, the seat rail bracket 42 is formed to have an open cross-sectional configuration whose vehicle upper side is open, and has flanges 52 at the top end thereof (i.e., the seat rail bracket 42 is formed in the shape of a hat as seen in front view). As shown in FIG. 2, a lower portion 44 of the seat rail bracket 42 is a shape that runs substantially along the shape of the rear portion of the bottom wall portion 36A of the floor reinforcement 36. As shown in FIG. 5, a bolt insert-through hole 44A is formed so as to pass through the front end of the lower portion 44 of the seat rail bracket 42. As shown in FIG. 2, the front end of the lower portion 44 of the seat rail bracket 42 is disposed in a state of abutting the bottom wall portion 36A of the floor reinforcement 36, and is mounted (fixed) to the bottom wall portion 36A of the floor reinforcement 36 and a bottom portion 32 of the rear floor side member 28 by fastening by a bolt 46 and a weld nut 48.

Further, as shown in FIG. 3, the seat rail bracket 42 has a pair of left and right side portions 50 that are bent substantially toward the vehicle upper side from the vehicle transverse direction both end portions of the lower portion 44. The depth of the seat rail bracket 42 (the height of the side portions 50) is relatively deep, and the seat rail bracket 42 is a structure that is difficult to deform by load that is applied substantially in the vehicle vertical direction. The flanges 52 are formed from the top end portions of the pair of left and right side portions 50, by being bent in directions of moving away from one another.

Figure 4:
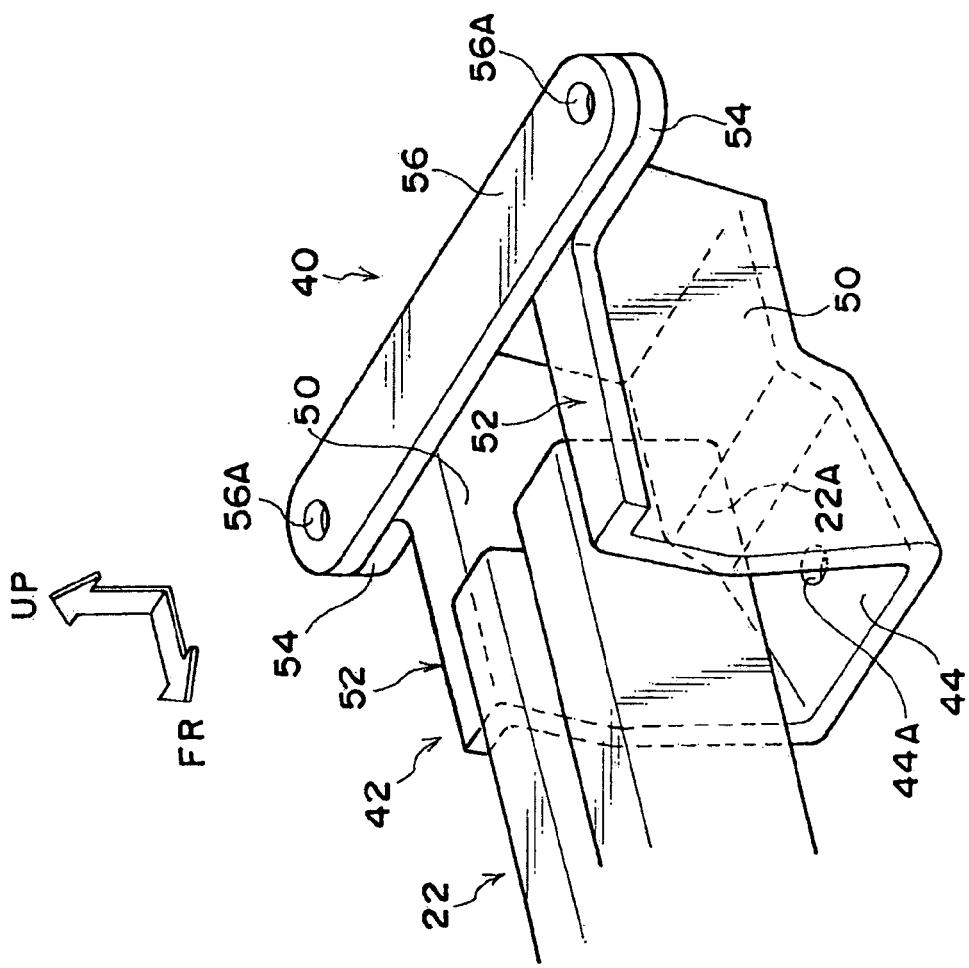
FIG. 4 is a perspective view showing a rear end portion of a seat slide rail and a connecting body of the seat holding portion structure relating to the first exemplary embodiment.

As shown in FIG. 5, flange rear end portions 54 of the pair of left and right flanges 52 project-out further to the left and the right and are for mounting. Bolt insert-through holes 54A are formed so as to pass through the flange rear end portions 54. As shown in FIG. 4, a plate 56, that serves as a lid and structures a portion of the connecting body 40, is joined by welding to the top surfaces of the flange rear end portions 54 (the flange top surfaces). Bolt insert-through holes 56A, that communicate with the bolt insert-through holes 54A of the flange rear end portions 54, are formed to pass-through the plate 56.

As shown in FIG. 3, the flange rear end portions 54 to which the plate 56 is joined are disposed in a state of abutting the mounting flange portion 36E of the floor reinforcement 36. The plate 56 and the flange rear end portions 54 are, together with the floor reinforcement 36 and the vehicle body floor 24, mounted (fixed) to the upper end flange portions 30 of the rear floor side member 28 by fastening by bolts 58 and weld nuts 60. Namely, the plate 56, the flange rear end portions 54 of the seat rail bracket 42, the mounting flange portion 36E of the floor reinforcement 36, the vehicle body floor 24, and the upper end flange portions 30 of the rear floor side member 28 receive the fastening loads due to the bolts 58 and the weld nuts 60. Due thereto, the points at which the seat rail bracket 42 are mounted to the rear floor side member 28 are, in addition to the one point that is mounted to the bottom portion 32 side, the two points that are mounted to the upper end flange portions 30.

Further, the plate 56, that connects the two points mounted to the rear floor side member 28 side, connects the pair of left and right flange rear end portions 54 of the seat rail bracket 42, and, together with the seat rail bracket 42, forms a closed cross-sectional structure. Namely, the connecting body 40 is made to be a closed cross-sectional structure as seen in a vehicle front view, due to the plate 56 and the seat rail bracket 42 being made to be integral.

As described above, the seat holding portion structure relating to the present exemplary embodiment is a body skeleton reinforcing structure for preventing buckling and deformation of the body skeleton to which the seat slide rail 22 is mounted, and is a structure that utilizes the rigidity and strength of the seat rail bracket 42.

(Operation and Effects)

The operation and effects of the above-described exemplary embodiment will be described next.

As shown in FIG. 2, the seat rail bracket 42 (connecting body 40), that is fixed to the rear end portion 22A of the seat slide rail 22, is disposed within the floor reinforcement 36 and is mounted to the bottom portion 32 and the upper end flange portions 30 of the rear floor side member 28. Therefore, at the time of a front collision for example, load that is applied to a seat belt device (not shown) from a vehicle occupant (more specifically, load that is applied to a belt anchor via a webbing) is transmitted to the rear floor side member 28 via the rear seat 10, the seat slide rail 22, the connecting body 40 and the floor reinforcement 36 (the load is inputted to the seat mounting portion). The rear floor side member 28 thereby receives load F that is obliquely upward toward the vehicle front side (refer to the direction of arrow F in FIG. 2 and FIG. 3) (i.e., the load is applied to the rear floor side member 28).

The seat rail bracket 42 (the connecting body 40) is disposed in a range that extends over the front and rear of the rear end side bent portion 34B of the kick portion 28C at the rear floor side member 28, and together with the floor reinforcement 36, is fixed to the bottom portion 32 and the upper end flange portions 30 of the rear floor side member 28. Therefore, the seat rail bracket 42, together with the rear floor side member 28 and the floor reinforcement 36, resists the load F in the range over the front and rear of the rear end side bent portion 34B. Thus, deformation of the rear floor side member 28 in this range is suppressed.

Further, as shown in FIG. 3, because the connecting body 40 is a closed cross-sectional structure as seen in a front view of the vehicle, the occurrence of cross-sectional collapsing (cross-sectional deformation) of the connecting body 40, and accordingly, the occurrence of cross-sectional collapsing of the rear floor side member 28, is effectively suppressed. In particular, in the present exemplary embodiment, at the connecting body 40, the plate 56 is joined to the top surfaces of the flange rear end portions 54 of the seat rail bracket 42 and, together with the seat rail bracket 42, forms a closed cross-sectional structure, and the both end portions of the plate 56 are, together with the seat rail bracket 42 and the floor reinforcement 36, mounted to the upper end flange portions 30 of the rear floor side member 28. Therefore, although a simple structure, the rigidity and strength in vicinities of the portions of the connecting body 40 that are mounted to the upper end flange portions 30 of the rear floor side member 28 are effectively increased. Even if the load F obliquely upward toward the front of the vehicle acts on the connecting body 40 via the seat slide rail 22 at the time of a collision, the occurrence of cross-sectional collapsing of the connecting body 40 and the rear floor side member 28 is effectively suppressed.

For these reasons, the occurrence of buckling, whose origin is the rear end side bent portion 34B of the rear floor side member 28 shown in FIG. 2, is prevented or suppressed. To explain further, for example, in a comparison structure in which a bracket, that is fixed to the rear end portion of the seat slide rail, is disposed within the kick portion in the opening of the vehicle body floor and is fixed only to the lower portion side of the rear floor side member, the cross-sectional rigidity and strength are lower than in the present exemplary embodiment. Here, even if, in a vicinity of the vehicle front side of the rear end side bent portion, the bottom surface and the side surfaces of the rear floor side member were to greatly deform and the cross-section were to collapse, after the cross-sectional collapsing, buckling would arise with its origin at the rear end side bent portion that is in the direct vicinity, at the vehicle rear side, of the seat slide rail mounting portion. However, in the present exemplary embodiment, the occurrence of such buckling is prevented or suppressed.

As described above, in accordance with the seat holding portion structure relating to the present exemplary embodiment, buckling of the rear floor side member 28, that is caused by input of load from the rear seat 10 side at the time of a collision, can be prevented or suppressed.

Second Exemplary Embodiment

Figure 6:
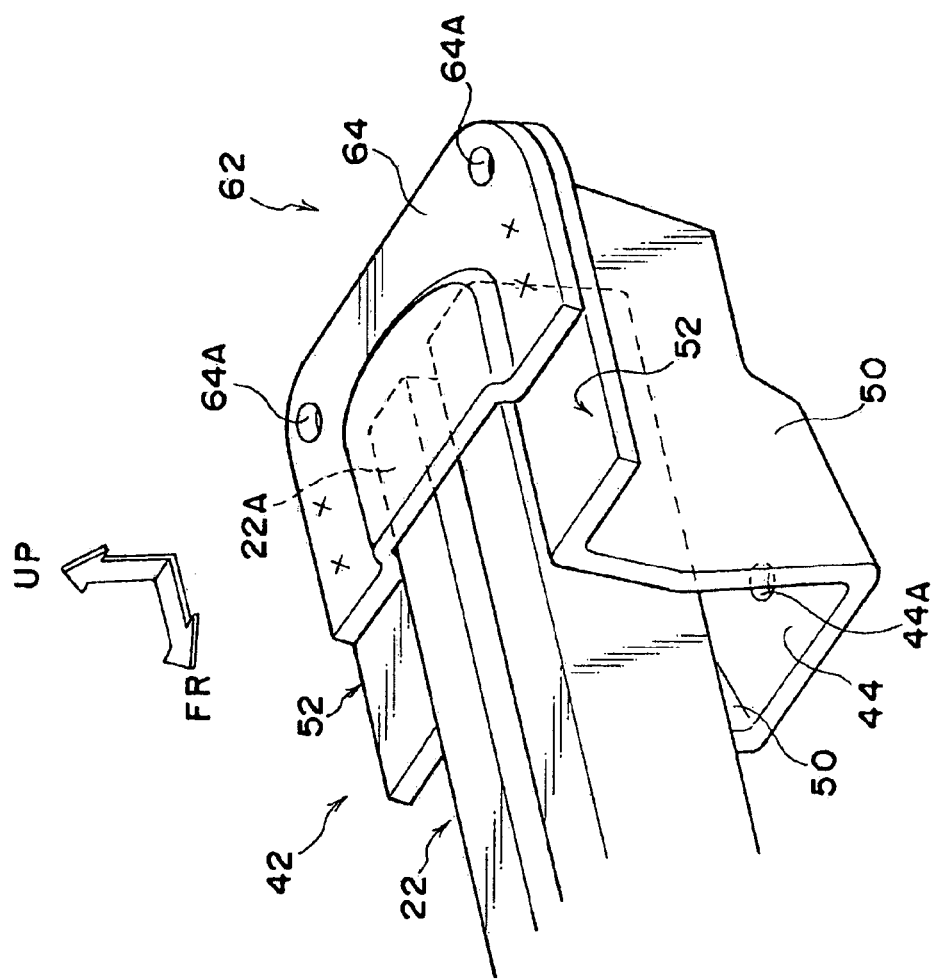
FIG. 6 is a perspective view showing a rear end portion of a seat slide rail and a connecting body of a seat holding portion structure relating to a second exemplary embodiment.

A seat holding portion structure relating to a second exemplary embodiment of the present invention will be described next by using FIG. 6. The main portions of the seat holding portion structure relating to the second exemplary embodiment of the present invention are shown in a perspective view in FIG. 6. As shown in FIG. 6, the seat holding portion structure relating to the second exemplary embodiment differs from the seat holding portion structure relating to the first exemplary embodiment, with regard to the point that the closed cross-sectional portion of a connecting body 62 extends substantially in the vehicle longitudinal direction so as to include a position that covers the rear end portion 22A of the seat slide rail 22. The other structures are substantially similar to those of the first exemplary embodiment. Accordingly, structural portions that are substantially similar to those of the first exemplary embodiment are denoted by the same reference numerals, and description thereof is omitted.

As shown in FIG. 6, a plate 64 that serves as a lid is joined by spot welding (the spot points are marked "X" in FIG. 6) to the top surfaces of the rear portions of the flanges 52 (the flange top surfaces) of the seat rail bracket 42, and, together with the seat rail bracket 42, forms a closed cross-sectional structure. Bolt insert-through holes 64A, that communicate with bolt insert-through holes (not shown) formed in the rear end portions of the flanges 52, are formed so as to pass-through the plate 64. Note that the plate 64 is joined to the top surfaces of the flanges 52 of the seat rail bracket 42 by spot welding in the present exemplary embodiment, but may be joined by projection welding.

In the same way as in the first exemplary embodiment, the rear end portion of the plate 64 and the rear end portions of the flanges 52 are, together with the mounting flange portion 36E of the floor reinforcement 36 and the vehicle body floor 24 shown in FIG. 3, mounted by fastening to the upper end flange portions 30 of the rear floor side member 28. As shown in FIG. 6, the plate 64 is provided to a position of covering the top portion side of the rear end portion 22A of the seat slide rail 22. The central portion of the front end side of the plate 64 protrudes-out at a position avoiding the top portion of the rear end portion 22A of the seat slide rail 22. In this way, the closed cross-sectional portion of the connecting body 62 extends substantially in the vehicle longitudinal direction, so as to include a position covering the rear end portion 22A of the seat slide rail 22. Note that this is structured so as to not impede the sliding of the seat rail inner 20 (see FIG. 3) in the vehicle longitudinal direction that accompanies adjustment of the seat.

In accordance with the above-described structure, the strength of the connecting body 62 increases, and it is more difficult for cross-sectional collapsing to arise. Even if the load F that is obliquely upward toward the front of the vehicle as shown in FIG. 2 acts on the seat slide rail 22, the connecting body 62 and the rear floor side member 28 (see FIG. 2) at the time of a collision, the load F can be stably supported. Further, even though the rear end portion 22A of the seat slide rail 22 shown in FIG. 6 is not covered by a separate cover (a resin cover or the like), foreign matter (e.g., rubbish, pebbles and the like) can be obstructed from falling-in (entering-in) between the connecting body 62 and the seat slide rail 22. Moreover, the appearance in the vicinity of the rear end portion 22A of the seat slide rail 22 is improved by the plate 64.

Third Exemplary Embodiment

Figure 7:
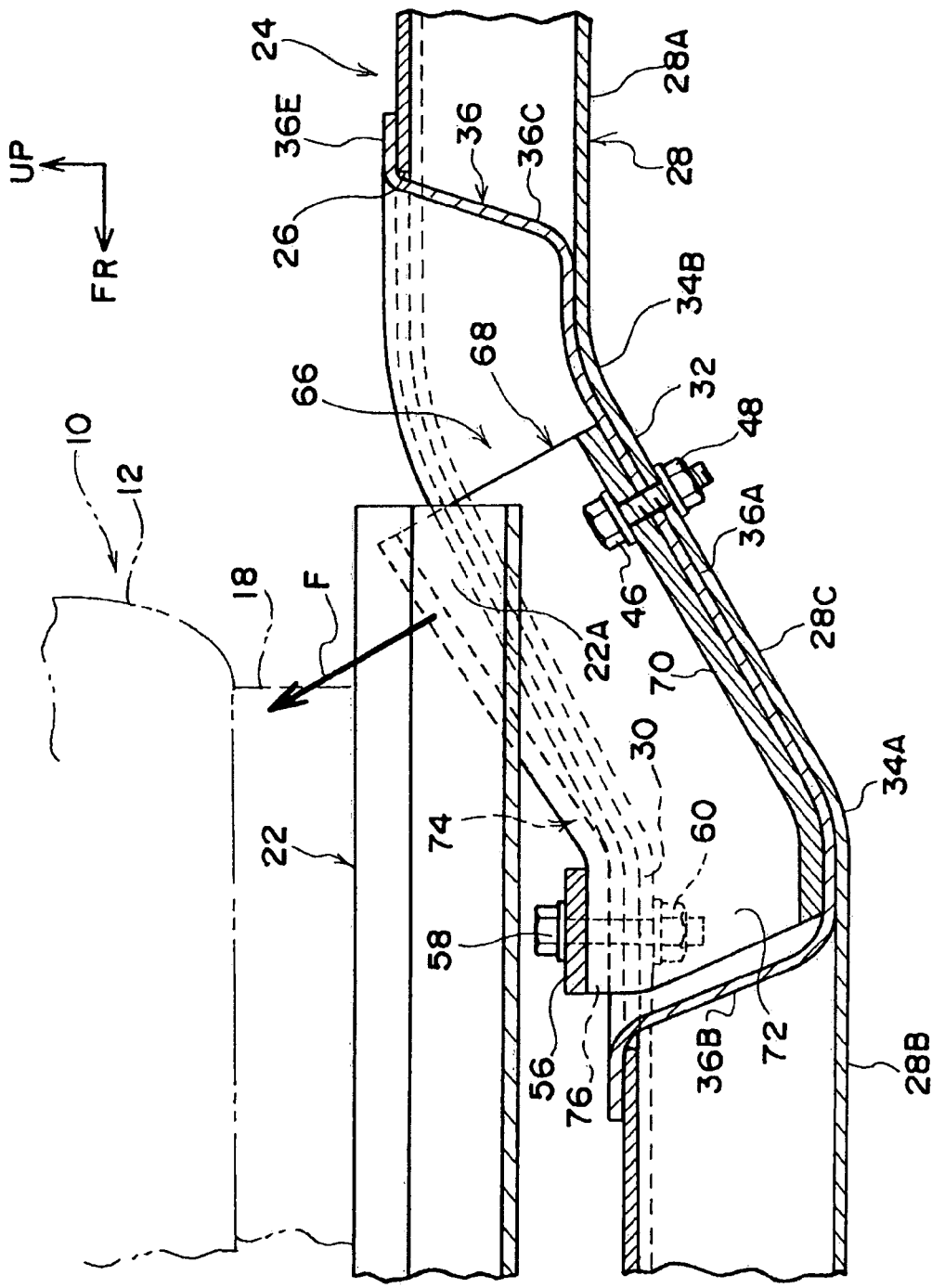
FIG. 7 is a longitudinal sectional view showing a state in which a seat holding portion structure relating to a third exemplary embodiment is cut along a rear floor side member, and this is viewed from a side of the vehicle.

A seat holding portion structure relating to a third exemplary embodiment of the present invention will be described next by using FIG. 7. The main portions of the seat holding portion structure relating to the third exemplary embodiment of the present invention are shown in FIG. 7 in a longitudinal sectional view (a view corresponding to FIG. 2 in the first exemplary embodiment). As shown in FIG. 7, the seat holding portion structure relating to the third exemplary embodiment differs from the seat holding portion structure relating to the first exemplary embodiment with regard to the points that a connecting body 66 is disposed in a range that extends over the front and rear (in the vehicle longitudinal direction) of the front end side bent portion 34A of the kick portion 28C at the rear floor side member 28, and the like. The other structures are substantially similar to those of the first exemplary embodiment. Accordingly, structural portions that are substantially similar to those of the first exemplary embodiment are denoted by the same reference numerals, and description thereof is omitted.

As shown in FIG. 7, the floor reinforcement 36 is disposed in a state in which the bottom wall portion 36A thereof abuts the bottom surfaces of a range extending over the front and rear (in the vehicle longitudinal direction) of the front end side bent portion 34A and the rear end side bent portion 34B (the bottom wall portion 36A abuts the bottom surfaces of the entire region of the kick portion 28C at the rear floor side member 28 and the regions in the vicinities of the front and rear of the kick portion 28C). The floor reinforcement 36 extends further toward the front side of the vehicle than the floor reinforcement 36 in the first exemplary embodiment, but the other basic structures are similar to those of the floor reinforcement 36 in the first exemplary embodiment. Accordingly, the floor reinforcement 36 is denoted by the same reference numeral, and description thereof is omitted.

As shown in FIG. 7, the rear end of the top portion of a seat rail bracket 68, that structures a portion of the connecting body 66, is fixed by welding to the rear end portion 22A of the seat slide rail 22. The seat rail bracket 68 is disposed within the floor reinforcement 36, and is disposed in a range that extends over the front and rear (in the vehicle longitudinal direction) of the front end side bent portion 34A of the kick portion 28C (the seat rail bracket 68 is a cover of the front end side bending point).

In the same way as the seat rail bracket 42 in the first exemplary embodiment (see FIG. 3), the seat rail bracket 68 forms a closed cross-sectional configuration whose vehicle upper side is open as seen in a front view of the vehicle, and has flanges 74 at the upper end thereof (i.e., is formed in the shape of a hat as seen in front view). A lower portion 70 of the seat rail bracket 68 is a shape that runs substantially along the shape of the front portion of the bottom wall portion 36A of the floor reinforcement 36. The rear end of the lower portion of the seat rail bracket 68 is disposed in a state of abutting the bottom wall portion 36A of the floor reinforcement 36, and is, together with the bottom wall portion 36A of the floor reinforcement 36, mounted (fixed) to the bottom portion 32 of the rear floor side member 28 by fastening by the bolt 46 and the weld nut 48.

Further, the seat rail bracket 68 has a pair of left and right side portions 72 that are bent substantially toward the upper side of the vehicle from the vehicle transverse direction both end portions of the lower portion 70. The flanges 74 are formed from the top end portions of the pair of left and right side portions 72, by being bent in directions of moving away from one another. Flange front end portions 76 of the pair of left and right flanges 74 project-out further to the left and the right. The plate 56 is joined by welding to the top surfaces of the flange front end portions 76 (the flange top surfaces).

In the same way as in the first exemplary embodiment, the flange front end portions 76 to which the plate 56 is joined are disposed in a state of abutting the mounting flange portion 36E of the floor reinforcement 36. The plate 56 and the flange front end portions 76 are, together with the floor reinforcement 36 and the vehicle body floor 24, mounted (fixed) to the top end flange portions 30 of the rear floor side member 28 by fastening by the bolts 58 and the weld nuts 60. Moreover, in the same way as in the first exemplary embodiment, the plate 56 connects the pair of left and right flange front end portions 76 of the seat rail bracket 68 together, and, together with the seat rail bracket 68, forms a closed cross-sectional structure. Namely, due to the plate 56 and the seat rail bracket 68 being made to be integral, the connecting body 66 forms a closed cross-sectional structure as seen in a front view of the vehicle (not shown).

In accordance with such a structure, when the rear floor side member 28 receives the load F, that is obliquely upward toward the vehicle front side, from the rear seat 10 side at the time of a collision, the connecting body 66, together with the rear floor side member 28 and the floor reinforcement 36, resists the load F at the range extending over the front and rear of front end side bent portion 34A.

Further, because the connecting body 66 is a closed cross-sectional structure as seen in a front view of the vehicle, the occurrence of cross-sectional collapsing (cross-sectional deformation) of the connecting body 66, and accordingly, the occurrence of cross-sectional collapsing of the rear floor side member 28, is effectively suppressed. In particular, in the present exemplary embodiment, at the connecting body 66, the plate 56 is joined to the top surfaces of the flange front end portions 76 of the seat rail bracket 68 and, together with the seat rail bracket 68, forms a closed cross-sectional structure, and the both end portions of the plate 56 are, together with the seat rail bracket 68 and the floor reinforcement 36, mounted to the upper end flange portions 30 of the rear floor side member 28. Therefore, although a simple structure, the rigidity and strength in vicinities of the portions of the connecting body 66 that are mounted to the upper end flange portions 30 of the rear floor side member 28 are effectively increased. The occurrence of cross-sectional collapsing of the connecting body 66, and accordingly, the occurrence of cross-sectional collapsing of the rear floor side member 28 is effectively suppressed. For these reasons, the occurrence of buckling, whose origin is the front end side bent portion 34A of the rear floor side member 28, is prevented or suppressed.

As described above, in accordance with the seat holding portion structure relating to the present exemplary embodiment, buckling of the rear floor side member 28, that is caused by input of load from the rear seat 10 side at the time of a collision, can be prevented or suppressed.

Fourth Exemplary Embodiment

Figure 8A:
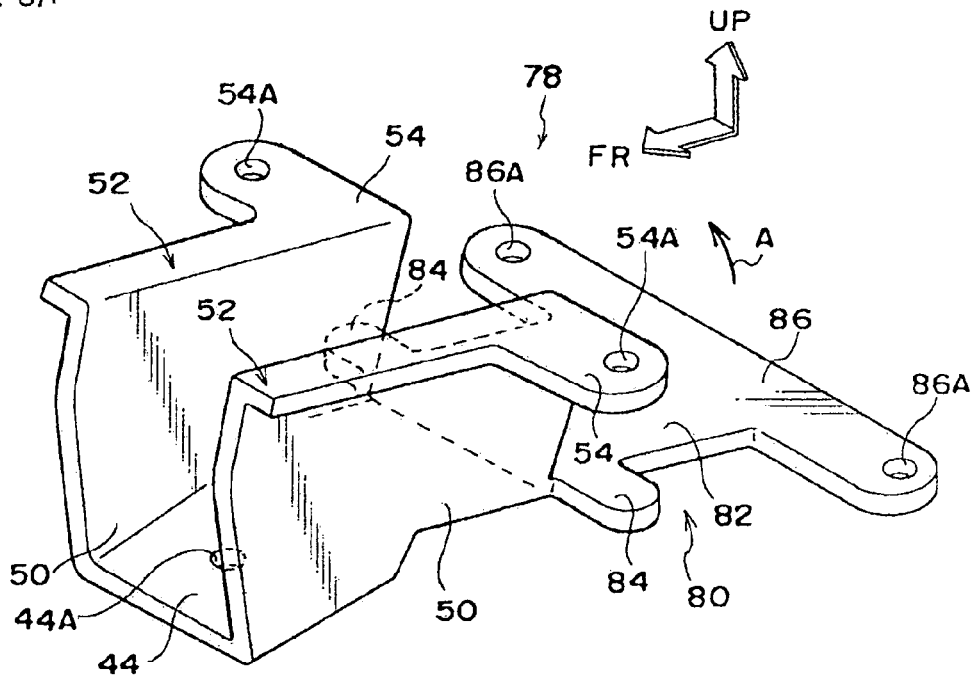
FIGS. 8A and 8B are perspective views showing states before formation of a connecting body of a seat holding portion structure relating to a fourth exemplary embodiment, where
Figure 8B:
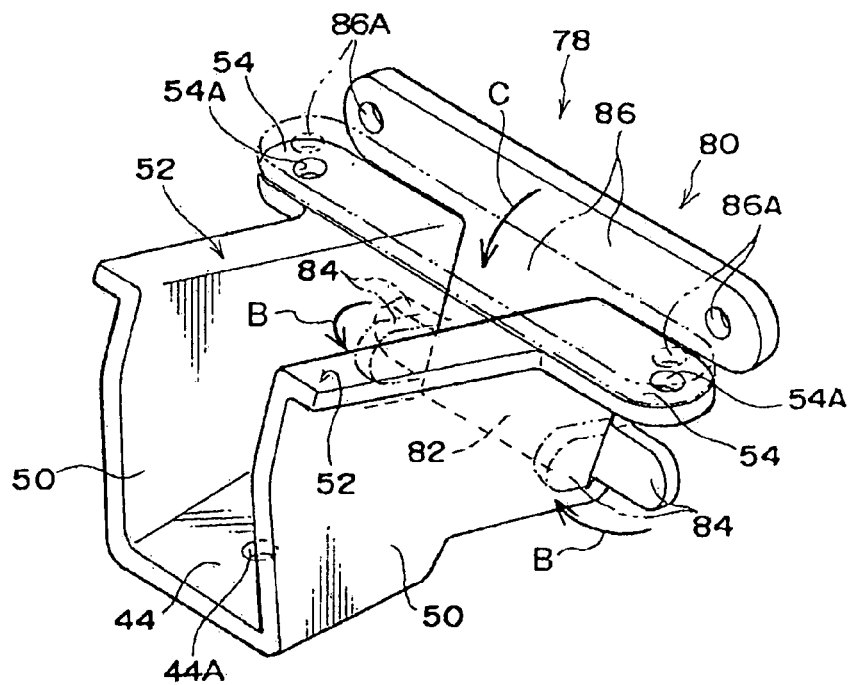

A seat holding portion structure relating to a fourth exemplary embodiment of the present invention will be described next by using FIG. 8A and FIG. 8B. States before the formation of a connecting body 78 of the seat holding portion structure relating to the fourth exemplary embodiment of the present invention are shown in perspective views in FIG. 8A and FIG. 8B. As shown in FIG. 8A and FIG. 8B, the seat holding portion structure relating to the fourth exemplary embodiment differs from the seat holding portion structure relating to the first exemplary embodiment with regard to the point that the connecting body 78 forms a closed cross-sectional portion without using the plate 56 (see FIG. 5) that is a separate body. The other structures are substantially similar to those of the first exemplary embodiment. Accordingly, structural portions that are substantially similar to those of the first exemplary embodiment are denoted by the same reference numerals, and description thereof is omitted.

Note that the connecting body 78 is a structure in which an extended portion 80, that extends from the lower portion 44 of the seat rail bracket 42 (see FIG. 5) in the first exemplary embodiment, is folded and is joined to the flange rear end portions 54 and the like. Therefore, structural portions that are similar to those of the seat rail bracket 42 (see FIG. 5) in the first exemplary embodiment are denoted by the same reference numerals, and description thereof is omitted.

A state before folding of the extended portion 80 is shown in FIG. 8A. As shown in FIG. 8A, the connecting body 78 has the extended portion 80 that extends toward the rear side of the vehicle from the lower portion 44 of the connecting body 78. The extended portion 80 has a rear side structural portion 82 for closing-off the rear end side of the connecting body 78, projecting portions 84 for joining that project-out in directions of moving away from near the lower portion 44 at the both vehicle transverse direction sides of the rear side structural portion 82, and a lid portion 86 that is provided at the rear end side of the rear side structural portion 82 and is for forming a closed cross-sectional structure at the rear portion of the connecting body 78 by being joined with the pair of left and right flange rear end portions 54. The lid portion 86 is formed in a shape similar to that of the plate 56 (see FIG. 3) in the first exemplary embodiment. Bolt insert-through holes 86A, that are for communicating with the bolt insert-through holes 54A of the flange rear end portions 54, are formed so as to pass-through the lid portion 86.

An intermediate step in folding the extended portion 80 and forming the connecting body 78 is shown in FIG. 8B. As shown in FIG. 8B, the rear side structural portion 82 is folded (refer to the direction of arrow A in FIG. 8A) so as to block-off the rear end side of the connecting body 78. Thereafter, the projecting portions 84 are folded toward the side portion 50 sides (in the directions of arrows B) and are joined by spot welding to the side portions 50. The lid portion 86 is folded at a substantially right angle (in the direction of arrow C), and the both end portions thereof are joined by spot welding to the flange rear end portions 54 (making the rear portion of the connecting body into a box-like shape).

In the same way as the connecting body 40 in the first exemplary embodiment, the connecting body 78 that is formed in this way is disposed within the floor reinforcement 36 shown in FIG. 2, and is disposed in a range that extends over the front and rear of the rear end side bent portion 34B of the kick portion 28C, and is, together with the floor reinforcement 36, mounted to the bottom portion 32 and the upper end flange portions 30 of the rear floor side member 28, and forms a closed cross-sectional structure as seen in a front view of the vehicle. Note that the mounting of the connecting body 78 (see FIG. 8A and FIG. 8B) to the rear floor side member 28 is similar to the first exemplary embodiment. In accordance with the above-described structure as well, operation and effects that are substantially similar to those of the previously-described first exemplary embodiment are obtained.

Supplemental Description of the Exemplary Embodiments

Note that, in the first, second and fourth exemplary embodiments, the connecting body 40, 62, 78 is disposed in a range that extends over the front and rear of the rear end side bent portion 34B of the kick portion 28C. In the third exemplary embodiment, the connecting body 66 is disposed in a range that extends over the front and rear of the front end side bent portion 34A of the kick portion 28C. However, the connecting body may be disposed in a range that extends over the front and rear (in the vehicle longitudinal direction) of the front end side bent portion of the kick portion and extends also over the front and rear (in the vehicle longitudinal direction) of the rear end side bent portion of the kick portion.

What is claimed is:

1. A seat holding portion structure comprising:
   a side member joined to a bottom surface side of a vehicle body floor and extending substantially in a vehicle longitudinal direction and, together with the vehicle body floor, forming a closed cross-sectional portion that extends substantially in the vehicle longitudinal direction, the side member having a kick portion that joins a front portion and a rear portion of the side member that are offset in a vehicle vertical direction, and front and rear end sides of the kick portion are bent;
   a floor reinforcement formed in a shape of a box whose vehicle upper side is open, the floor reinforcement being installed within the side member from an opening portion of the vehicle body floor that is formed in a vicinity of the kick portion;
   a seat holding member that is elongated and extends in the vehicle longitudinal direction at a vehicle upper side of the vehicle body floor, and supports a vehicle seat, a rear end portion of the seat holding member being inserted in the floor reinforcement; and
   a connecting body fixed to the rear end portion of the seat holding member and disposed within the floor reinforcement, and disposed in a range that extends over a front and rear of at least one of the front end side bent portion and the rear end side bent portion of the kick portion, and, together with the floor reinforcement, mounted to a bottom portion and an upper end portion of the side member, and formed as a closed cross-sectional structure as seen in a vehicle front view.

2. The seat holding portion structure of claim 1 wherein a closed cross-sectional portion of the connecting body extends substantially in the vehicle longitudinal direction so as to include a position covering the rear end portion of the seat holding member.

3. The seat holding portion structure of claim 1, wherein the connecting body is structured to include a bracket that has a flange at an upper end and is formed in an open cross-sectional shape whose vehicle upper side is open as seen in a vehicle front view, and a lid that is joined to a flange top surface of the bracket, and, together with the bracket, forms a closed cross-sectional structure, and, together with the bracket and the floor reinforcement, is mounted to the upper end portion of the side member.

* * * * *